United States Patent [19]
Chapman

[11] Patent Number: 4,726,979
[45] Date of Patent: Feb. 23, 1988

[54] HEAT TRANSFER BARRIER LABEL

[75] Inventor: Fred W. Chapman, Hopkinton, Mass.
[73] Assignee: Dennison Manufacturing Company, Framingham, Mass.

[21] Appl. No.: 130,303
[22] Filed: Apr. 14, 1980

Related U.S. Application Data

[63] Continuation-in-part of Ser. No. 292,611, Jun. 3, 1977, abandoned, which is a continuation of Ser. No. 555,338, Mar. 4, 1975, abandoned.

[51] Int. Cl.[4] .......... B32B 3/00; B32B 18/00
[52] U.S. Cl. .......... 428/200; 428/352; 428/914; 156/240
[58] Field of Search .......... 428/263, 343, 349, 914, 428/200, 202, 201, 212, 352, 40, 41, 42; 156/240, 230, 234, 235, 239, 238, 231

[56] References Cited

U.S. PATENT DOCUMENTS

| | | | |
|---|---|---|---|
| 3,589,962 | 6/1971 | Bonjour | 428/216 |
| 3,922,435 | 11/1975 | Asnes | 428/349 |
| 3,944,695 | 3/1976 | Kosaka et al. | 428/200 |
| 4,018,728 | 4/1977 | Priest | 260/17 R |
| 4,021,591 | 5/1977 | DeVries et al. | 428/200 |
| 4,027,345 | 6/1977 | Fujisawa et al. | 156/234 |
| 4,037,008 | 7/1977 | Tugwell | 156/230 |
| 4,234,643 | 11/1980 | Grotefend et al. | 428/202 |
| 4,235,657 | 11/1980 | Greenman et al. | 156/234 |

FOREIGN PATENT DOCUMENTS

| | | | |
|---|---|---|---|
| 1290403 | 9/1972 | United Kingdom | 427/148 |

*Primary Examiner*—Jerome Massie
*Assistant Examiner*—Louis Falasco
*Attorney, Agent, or Firm*—George E. Kersey

[57] ABSTRACT

Product and process for heat transfer labeling. A transfer layer containing a design print is superimposed upon a contoured release layer that is desirably imprinted on a carrier. When the carrier, together with the release layer and the transfer layer are applied to an object to be labeled and heated, both the release layer and the transfer layer become molten and the transfer layer becomes adhered to the object being labeled. The release layer and the transfer layer are immiscible when in a molten state. The desired immiscibility can be achieved by the inclusion of a barrier layer between the transfer layer containing the design print and the release layer.

13 Claims, 13 Drawing Figures

HEAT TRANSFER BARRIER LABEL

This is a continuation-in-part of Ser. No. 792,611, filed June 3, 1977 (abandoned), which is in turn a continuation of Ser. No. 555,338, filed Mar. 4, 1975 (abandoned).

BACKGROUND OF THE INVENTION

The invention relates to the labeling of objects by the use of heat to transfer design prints from a carrier to objects being labeled.

In heat transfer labeling, a design print overlying a release layer on a carrier is brought into contact with an object to be labeled. When heat is applied to the carrier, the release layer becomes molten and permits the design print to be transferred to the object.

In the typical heat transfer label, as exemplified by U.S. Pat. No. 3,616,015, which issued Oct. 26, 1971, the release layer is a coating of wax on the carrier and the design print is in a transfer layer that is printed on the wax coating. With such a label, the application of heat during the transfer process causes a film of wax to be deposited over the entire region where the carrier is in contact with the object being labeled. The deposited film is of random configuration and is frequently much larger than the design print.

Although the wax film is transparent and generally not noticeable by casual observation, under certain lighting conditions the film is viewable and can present an objectionable appearance. The resulting film can be regarded as an expanded, irregular "halo" that surrounds the design print. Not only can the irregular halo present an objectionable appearance, it represents a wastage of material. Moreover, because of the tendency of the wax to penetrate the carrier material used in ordinary heat transfer labeling, a substantial amount of wax material is needed to form the transfer coating.

Accordingly, it is an object of the invention to facilitate the heat transfer labeling of objects. Another object is to improve the appearance of heat transfer labels. A related object is to eliminate the enlarged, irregular halo often encountered in heat transfer labeling. Still another object is to economize on the amount of material needed for the release layer in the heat transfer labeling of objects.

A further object of the invention is to achieve an enhanced appearance of the design print where the amount of material needed for the release layer has been economized.

A still further object is to facilitate the adhesion of the transfer layer to a surface being labeled where the amount of material needed for the release has been economized and the surface exhibits a high degree of irregularities.

Yet another object of the invention is to adapt relatively high temperature transfer materials for use at lower transfer temperatures where the amount of material needed for the release has been economized.

Still another object of the invention is to facilitate the application of the transfer layer with respect to the release layer where the amount of material needed for the release has been economized.

SUMMARY OF THE INVENTION

In accomplishing the foregoing and related objectives, the invention provides for the use of a plastic release layer which is contoured in accordance with a prescribed pattern and is in registration with a transfer layer, which includes a design print and with which the release layer is immiscible at transfer temperatures. The term "immiscible" is used in the conventional chemical sense to describe liquids that will not mix.

Because of the immiscibility of the release and transfer layers at transfer temperatures, there is no undesired absorption between the layers. This avoids degradation of the design print by partial absorption or mixing with the release layer.

In accordance with one aspect of the invention, the desired immiscibility is achieved by the use of design print lacquers which are printable upon the release layer but have a higher melting point than the release layer. A suitable ink lacquer for this purpose is composed of isobutylmethacrylate with various additives such as maleic rosin and polyisoprene.

In accordance with another aspect of the invention, the desired immiscibility of the release and transfer layers at the transfer temperature is achieved by the use of a barrier. A suitable barrier which also has desirable product resistance characteristics is formed by two interspersed polymers of which one is a film-forming multiaromatic ring condensation product and the second polymer reinforces the first and preferably contains bulky ring structures. In general any lacquer immiscible at the heat transfer temperature will provide a suitable barrier layer.

In accordance with still another aspect of the invention the release material is a polyamide resin having a softening point in the range from 95° to 105° C. The softening temperature of the resin is desirably lowered by the inclusion of a plasticizer additive, and surface lubricity is improved by the inclusion of wax. Other suitable materials for the release layer include rosins (which include rosin esters), polyterpenes, vinyl toluene/alpha/methyl styrene copolymers and ethylene/vinyl acetate copolymers.

In accordance with a further aspect of the invention, the transfer layer is provided with increased flowability to make it suitable for application to materials with irregular surfaces by the inclusion of release material in the adhesive portion of its formulation.

DESCRIPTION OF THE DRAWINGS

Other aspects of the invention will become apparent after consideration of several illustrative embodiments taken in conjunction with the drawings in which.

DETAILED DESCRIPTION

Figure 1A:
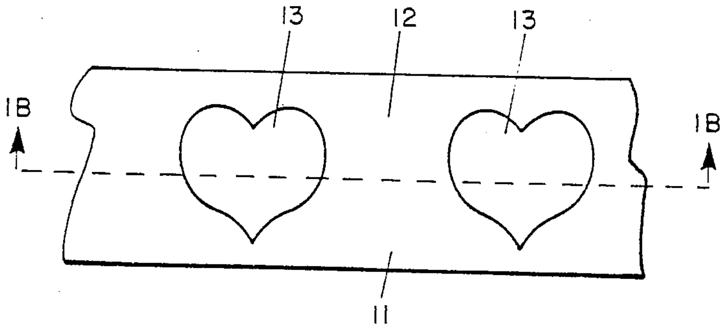
FIG. 1A (PRIOR ART)
FIG. 1A is a plan view of a heat transfer label carrier of the prior art.
Figure 1B:
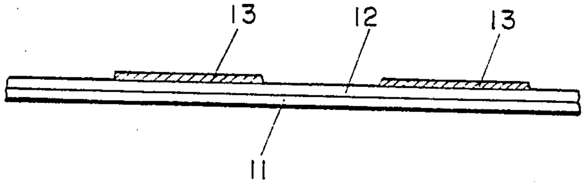
FIG. 1B (PRIOR ART)
FIG. 1B is a sectional view of the carrier of FIG. 1A.
Figure 1C:
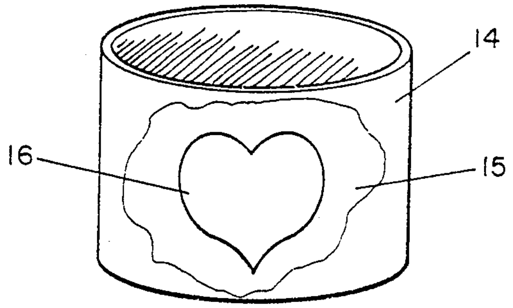
FIG. 1C (PRIOR ART)
FIG. 1C is a perspective view of an object that has been labeled using the carrier of FIG. 1A.

With reference to FIGS. 1A through 1C of the drawings, a carrier 11 (FIGS. 1A and 1B) in accordance with the prior art is provided with a coating 12 upon which is superimposed a transfer layer 13 which includes a design print.

When the transfer layer 13 of the carrier 11 is brought into contact with an object to be labeled, such as the illustrative container 14 of FIG. 1C, and heat is applied, the wax coating 12 melts and allows the contacting portion of the transfer layer 13 to adhere to the container 14. Simultaneously a wax film 15 from the release layer 12 is deposited on the container 14. This film is of irregular configuration and considerably larger than the transferred design print 16. Under certain viewing conditions the film 15 presents an objectionable appearance.

Figure 2A:
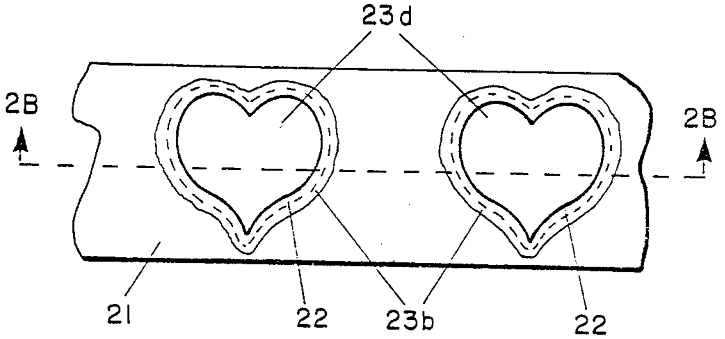
FIG. 2A is a plan view of a heat transfer label carrier in accordance with the invention.
Figure 2B:
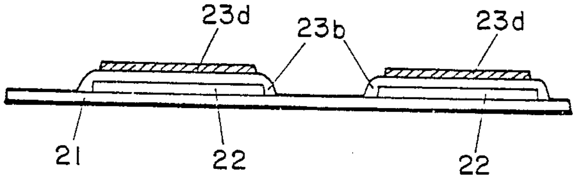
FIG. 2B is a sectional view of the carrier of FIG. 2A.
Figure 2C:
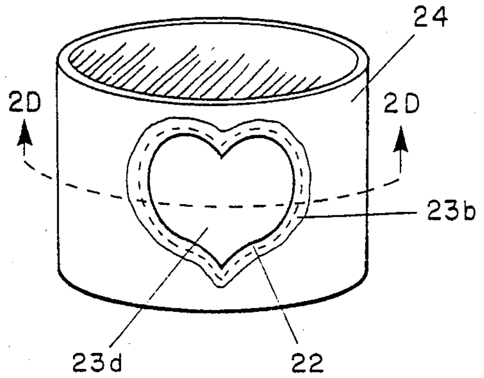
FIG. 2C is a perspective view of an object that has been labeled using the carrier of FIG. 2A.
Figure 2D:
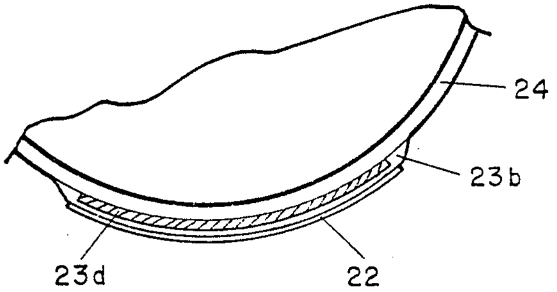
FIG. 2D is a sectional view of the object of FIG. 2C.

To remedy the foregoing difficulties, the invention provides a heat transfer labeling arrangement as shown in FIGS. 2A and 2B in which a contoured release layer 22 is applied to the carrier. The contoured release layer 22 underlies a barrier layer **23*b* and a transfer layer containing a design print 23*d*. As a result, when the transfer layer 23*d* is brought into contact with an object to be labeled, such as the illustrative container 24 of FIG. 2C, the transferred design print 23*d* has superimposed on it a release layer 22 which provides a contoured halo with a narrow margin. In addition, the transfer layer 23*b* also provides a margin with respect to the transferred design print 23*d*. In the particular embodiment of FIG. 2A, the margin for the barrier layer 23*b* extends beyond that of the release layer 22. This serves to seal the design print 23*d* and increase the mechanical and abrasive resistance of the decoration. In these cases where product resistance is not a significant consideration, the barrier layer 23*b* can be co-extensive with the design print, as can the release layer 22**.

In the particular embodiment of FIGS. 2A and 2B the margin of the barrier over the release is insufficient to cause any release difficulty. In cases where the margin of the barrier begins to pose a hindrance to release, the barrier margin can be reduced and even be made coextensive with that of the release layer 22. Moreover, while it is desirable for the release layer 22 to be larger than the design print **23*d***, these two layers may also be coextensive.

Figure 3A:
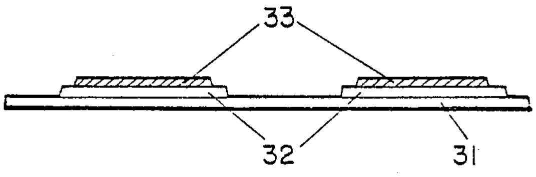
FIG. 3A is a sectional view of an alternative heat transfer label in accordance with the invention.

As seen in FIG. 2B the barrier **23*b* provides suitable isolation between the ink layer of the design print 23*d* and the release layer 22** at the heat tranfer temperature.

Where the design print layer is immiscible with the release layer at heat transfer temperatures, the barrier layer may be omitted, as indicated in the embodiment of FIG. 3A. In this embodiment a design print layer 33 is directly superimposed on a release layer 31.

Figure 3B:
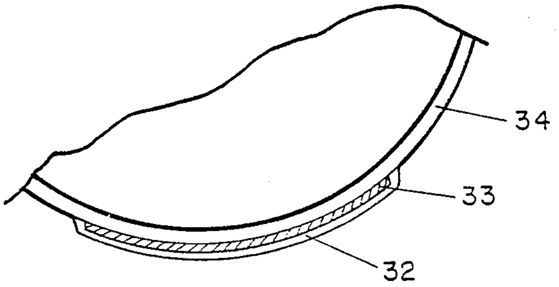
FIG. 3B is a sectional view of an object that has been labeled using the carrier of the alternative heat transfer label of FIG. 3A.

When the embodiment of FIG. 3A is used to decorate a container, with the result shown in FIG. 3B, the wall 34 of the illustrative container has superimposed on its external surface only two layers, namely a transfer layer 33 containing the desired design print, and a release layer 32. Both the design print layer 33 and the release layer 32 are molten at heat transfer temperatures. Because of their chemical compositions, however, the two layers 32 and 33 are immiscible with one another at heat transfer temperatures.

Figure 4A:
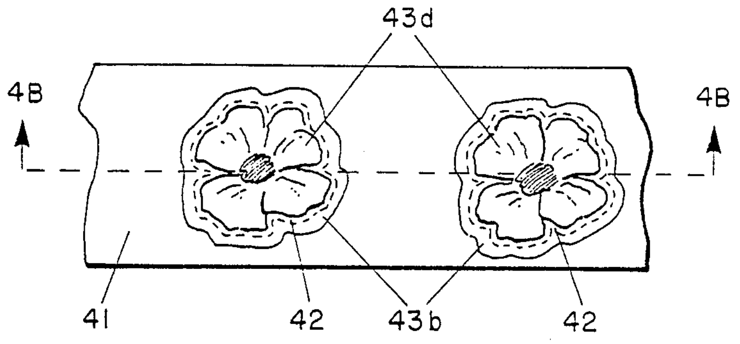
FIG. 4A is a plan view of an alternative heat transfer label carrier in accordance with the invention.
Figure 4B:
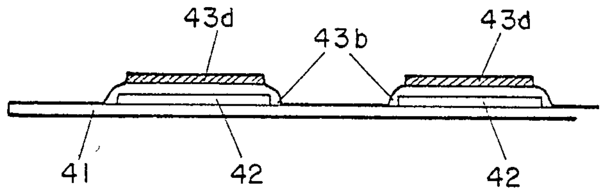
FIG. 4B is a sectional view of the alternative carrier of FIG. 4A.
Figure 4C:
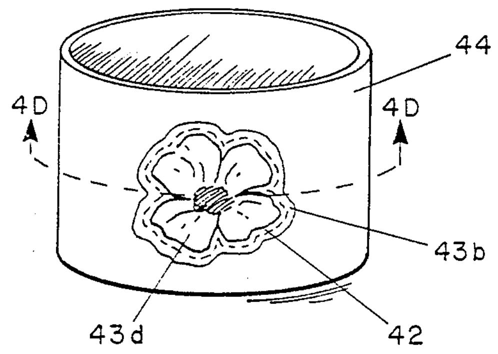
FIG. 4C is a perspective view of an object that has been decorated using the carrier of FIG. 4A.
Figure 4D:
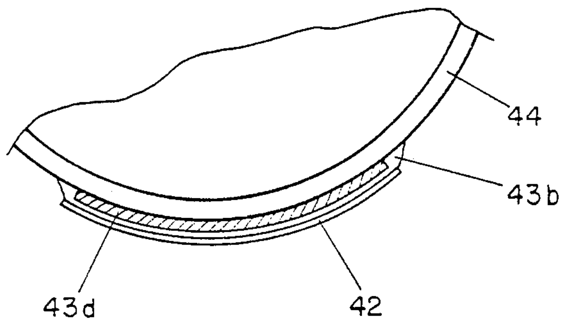
FIG. 4D is a sectional view of the object of FIG. 4C.

The invention is further illustrated in FIGS. 4A through 4D, in which a design print **43*d* has an irregular external contour provided by the petals of a flower. Since the release layer 42** is printed, it can closely follow the irregular contour of the petals, desirably having, as in FIGS. 2A and 2B, a relatively uniform margin with respect to the design. Such a margin may be provided by a strip of substantially uniform width which follows the contour of the design, which can include lettering. In the latter case there can be internal voids, such as the interiors of closed letters like an "O" or a "P". Alternatively, the margin of the release layer may be provided with respect to a block of lettering, following the indentation and undulation of the letters only at the periphery of a lettered block of printing. The result in each case is a more aesthetically pleasing decoration as illustrated in FIG. 4C. This is to be compared with the highly irregular and disproportionate release layer residue that has conventionally accompanied prior art heat transfer decorations as shown in FIG. 1C.

The release layers 22 and 32 are desirably applied to a carrier by printing. For that purpose suitable materials are resins such as polyamides, rosins (including rosin esters), polyterpenes, vinyl toluene/alpha methyl styrene copolymers, and ethylene/vinyl acetate copolymers. A suitable material for the barrier layer **23*b* and the transfer layer 33 is formed by interspersing a multiaromatic ring condensation product with a bulky ring structure. When the barrier is present, the inks of the design print portion 23*d* can be of the conventional polyamide-nitrocellulose variety; when the barrier 23*b*** is omitted, the transfer layer can be a pigmented aromatic, acid-based polyester or a pigmented monomeric acrylic ester of acrylic or methacrylic acid with modifiers such as maleic rosin, cumarone-indene resin and polyisoprene. Maleic rosin is the reaction product of a typical rosin such as abietic acid rosin ester with maleic anhydride. Other suitable barrier lacquers include acrylic resins, in particular polyacrylates and polymethacrylates (cellulose esters, polyvinylidene chloride, acrylonitrile/vinylidene chloride copolymers, and vinyl acetate/vinyl chloride copolymers.

The practice of the invention is further illustrated in the following non-limiting examples:

EXAMPLE I

A polyamide resin sold and marketed under the trade name Emerez 1536 of Emery Industries was dissolved in 70 parts isopropyl alcohol and 30 parts toluene to form a solution with a concentration of 30 percent resin. Emerez is made by the polymerization of a diamine with dimer of a fatty acid. The solution was modified with 2 percent wax and 4 percent castor oil. The resulting solution was then printed in a contoured pattern on a paper carrier of conventional bodystock for heat transfer labeling using a rotogravure press. The print pattern was dried to remove the solvent and overprinted with a barrier layer formed by a mixture of 80 parts of Vitel PE200, Goodyear polyester, and 26.7 parts by weight of polymerized elastomeric rosin ester, Hercules Neolyn 23-75T, dissolved in methlethylketone. Neolyn is an alkyd resin supplied either as a solid or with 75 percent solids in toluene. The barrier layer was then overprinted with conventional polyamide-nitrocellulose inks. This was followed by overprinting with a conventional polyamide-nitrocellulose adhesive modified by the addition (to the extent of four percent of the adhesive) of a mixture of wax and 1536 polyamide resin to lower the melting point of the adhesive and increase its flowability, when heated, with respect to the surface to be decorated. The resulting product was used to transfer the ink layer design print to a container. Good transfer was achieved with an insignificant release halo. In addition the barrier layer provided resistance to degradation of the transferred design print by abrasion or chemical attack by products of the kind often stored in decorated containers.

In particular the polyamide resin used in Example I had the following characteristics:

a. Softening range: 95°-105° C.

b. Melt viscosity: 3.5-5.0 poise at 160° C.

c. Molten color: 12 Gardner (1967)

d. Viscosity in 40% mixed solvent: 66 cps at 25° C.

e. Viscosity in 40% n-propanol: 62 cps at 25° C.

EXAMPLE II

Example I was repeated except that the release layer was modified by the addition of 16% castor oil and 8% erucamide, which is a fatty amide of cis-13-docosenoic acid, sold and marketed under the trade name "Kenamide E". According to the manufacturer this fatty amide has an average molcular weight of 335, an iodine value in the range between 70-80, a capillary melting point in the range between 76°-86° C., and a Gardner color maximum of 5. The use of the amide additive permitted the use of an increased amount of castor oil plasticizer, which resulted in an advantageous lubricity from the release layer, e.g., the outer surface of the transferred decoration.

EXAMPLE III

A release material was prepared in accordance with Example I and overprinted with a design print transfer layer of isobutylmethacrylate modified with maleic rosin and polyisoprene. The particular modified isobutylmethacrylate was a pigmented lacquer sold and marketed by the Gotham Corporation under the trade name "miroto", e.g., Miroto Hard Red 40-712. The resulting product afforded a suitable printed release transfer to glass surfaces.

EXAMPLE IV

A release material was prepared in accordance with Example I and overprinted with a design print transfer layer formed by pigmenting an aromatic acid-based polyester. The particular pigmented layer was a lacquer sold and marketed by Gotham Corporation under the name "polyroto", which is a polyester of the kind sold and marketed by Goodyear under the names Vitel PE200 and PE 222. The resulting product afforded a suitable printed release transfer to plastic surfaces.

EXAMPLE V

Examples I through IV were repeated using Emerez 1537 in place of Emerez 1536.

Other suitable barrier materials are of the kind disclosed for the protective layer in co-pending application Ser. No. 787,125 filed Apr. 13, 1977, which is a continuation-in-part of application Ser. No. 599,431 filed July 28, 1975, which in turn is a continuation of application Ser. No. 401,590 filed Sept. 28, 1973.

The barrier lacquer can be mixed with pigment and comprises 20-40 weight percent solids in an ink having common printing solvents as 60-80 weight percent. The admixture of lacquer and pigment will be in accord with conventional printing practice.

From 5 to 20, preferably 10, weight percent of paraffin wax or other modifiers are added to the release layer material to lower its melting temperature and effect transfer at lower heating temperatures, lower pressures and/or higher speeds of conveyor movement, consistent with maintaining integrity of the heat transfer printed matter.

The other examples of the invention in accordance with the foregoing disclosure, which is illustrative only, will occur to those of ordinary skill in the art.

I claim:

1. A heat transfer labeling material comprising:

a layer which is molten at heat transfer temperatures, for transfer to an object;

a carrier;

a heat sensitive release layer which is molten at heat transfer temperatures interposed between the transfer layer and said carrier for separating at the heat transfer temperatures to release the transfer layer from the carrier;

said transfer layer and said release layer being immiscible in one another when in a molten state at heat transfer temperatures.

2. A heat transfer labeling material in accordance with claim 1 wherein said release layer has a melt viscosity in the range from 3.5 to 8.5 poises at 160° C.

3. A heat transfer labeling material in accordance with claim 1 wherein an adhesive layer overlies said transfer layer.

4. A heat transfer layer in accordance with claim 3 wherein said adhesive includes a wax.

5. A heat transfer labeling material in accordance with claim 1 wherein said release layer includes a plasticizer.

6. A heat transfer labeling material in accordance with claim 1 further including a barrier between said transfer layer and said release layer.

7. A heat transfer labeling material in accordance with claim 6 wherein said barrier is formed by two interspersed polymers.

8. A heat transfer labeling material in accordance with claim 7 wherein one of said interspersed polymers is a film-forming multiaromatic ring condensation product and the second polymer reinforces the first and contains bulky ring structures.

9. A heat transfer labeling material in accordance with claim 1 wherein the transfer layer is provided with increased flowability to make it suitable for application to materials with irregular surfaces.

10. A heat transfer labeling material in accordance with claim 9 wherein said transfer layer includes an adhesive layer containing release material therein.

11. A heat transfer labeling material in accordance with claim 1 wherein said release layer consists substantially of a material selected from the following class: polyamide resins, rosins (including rosin esters), polyterpenes, vinyl toluene/alpha/methyl styrene copolymers and ethylene/vinyl acetate copolymers.

12. A heat transfer labeling material in accordance with claim 6 wherein said barrier layer consists substantially of a material selected from the following class: aromatic polyesters, acrylic resins, cellulose esters, polyvinylidene chloride, acrylonitrile/vinylidene chloride copolymers, and vinyl acetate/vinyl chloride copolymers.

13. A heat transfer labeling material in accordance with claim 12 wherein said acrylic resins are selected from the class of polyacrylates and polymethylacrylates.

* * * * *